(12) United States Patent
Müller

(10) Patent No.: US 8,001,865 B2
(45) Date of Patent: Aug. 23, 2011

(54) ELECTROMAGNETIC SHIFTING DEVICE COMPRISING A LINEAR MOTOR

(75) Inventor: Bernd Müller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 288 days.

(21) Appl. No.: 12/280,087

(22) PCT Filed: Feb. 14, 2007

(86) PCT No.: PCT/EP2007/051427
§ 371 (c)(1),
(2), (4) Date: Aug. 20, 2008

(87) PCT Pub. No.: WO2007/099034
PCT Pub. Date: Sep. 7, 2007

(65) Prior Publication Data
US 2009/0282943 A1 Nov. 19, 2009

(30) Foreign Application Priority Data
Mar. 2, 2006 (DE) .......................... 10 2006 009 606

(51) Int. Cl.
*F16H 3/083* (2006.01)
(52) U.S. Cl. ............... 74/372; 310/12.14; 310/12.32
(58) Field of Classification Search ............ 74/473.36, 74/473.37, 473.12, 371, 372; 318/135
See application file for complete search history.

(56) References Cited

U.S. PATENT DOCUMENTS

| | | | | |
|---|---|---|---|---|
| 878,778 A | * | 2/1908 | Dawson | 74/371 |
| 2,170,926 A | | 8/1939 | Keller | |
| 2,969,134 A | * | 1/1961 | Wiedmann et al. | 192/84.92 |
| 5,827,148 A | * | 10/1998 | Seto et al. | 477/15 |
| 6,065,361 A | * | 5/2000 | Martin et al. | 74/371 |
| 6,886,425 B2 | * | 5/2005 | Petzold | 74/339 |
| 7,786,684 B2 | * | 8/2010 | Hanlon et al. | 318/135 |
| 2010/0071497 A1 | * | 3/2010 | Reisch et al. | 74/473.12 |

FOREIGN PATENT DOCUMENTS

| | | |
|---|---|---|
| DE | 30 13 382 A1 | 10/1981 |
| DE | 199 47 405 A1 | 4/2001 |
| DE | 100 07 847 A1 | 8/2001 |
| DE | 101 03 664 A1 | 8/2002 |
| GB | 943634 | 12/1963 |
| WO | WO-00/08356 | 2/2000 |

* cited by examiner

Primary Examiner — Richard W Ridley
Assistant Examiner — Terence Boes
(74) Attorney, Agent, or Firm — Davis & Bujold, P.L.L.C.

(57) ABSTRACT

An electromagnetic shifting device for a transmission (1) with an electronic control unit (22) and toothed gear wheels (6, 7), which are mounted to rotate on a transmission shaft (2) about an axis (3). To implement a gear stage, the toothed gear wheels can be connected in a rotationally fixed manner to the transmission shaft by moving a shifter pawl (4) axially along the axis. The shifter pawl is moved axially along the axis by a linear motor (12).

15 Claims, 2 Drawing Sheets

ELECTROMAGNETIC SHIFTING DEVICE COMPRISING A LINEAR MOTOR

This application is a national stage completion of PCT/EP2007/051427 filed Feb. 14, 2007, which claims priority from German Application Serial No. 10 2006 009 606.1 filed Mar. 2, 2006.

FIELD OF THE INVENTION

The invention concerns an electromagnetic shifting device for a vehicle transmission.

BACKGROUND OF THE INVENTION

In the prior art shift transmissions are described, in which gears are engaged by way of sliding sleeves. Such a sliding sleeve is connected to a shifting device which can comprise a shift fork with slide blocks and a shift rod. The sliding sleeve is connected in a rotationally fixed manner to the transmission shaft by the shifting device. Toothed gearwheels mounted to rotate on the transmission shaft, which mesh with other toothed gear wheels attached solidly on the countershaft. When the sliding sleeve is axially displaced by the shifting device in the direction toward the toothed gear wheel mounted to rotate on the transmission shaft, by virtue of interlocking teeth, a torque-transmitting connection is produced between the transmission shaft and the countershaft. For this the shifting device can be actuated by hand or automatically by way of an actuator. For example in automatic transmissions, shifting is performed by an actuating cylinder which can be controlled pneumatically or hydraulically or by an electric actuator. The disadvantages of such shift mechanisms are wear phenomena of the mechanical components and the large masses that have to be moved during the shift operation.

Likewise in the prior art shift transmissions are described whose clutches and brakes are actuated by the supply of pressure medium from a transmission shaft. From DE 30 13 382 A1, a device is known in which both a clutch and two brakes are actuated by a pressure medium. For this, the pressure medium is delivered to an annular cylinder space via the transmission shaft. In the unpressurized condition, the clutch, which is made as a disk clutch, is disengaged and the brake disks of the brakes form a frictional connection. This initial position is realized by corresponding spring forces. A build-up of pressure in the cylinder space displaces pressure plates, whereby the disk clutch is engaged and the brakes are released. Uniting the movement of the pressure plates reliably prevents simultaneous engagement of the clutch and brakes.

From DE 100 07 847 A1, a shifting device for a transmission is known, which is actuated electromagnetically. Toothed gearwheels are mounted to rotate on a transmission shaft and have internal teeth. A shifter pawl is arranged on the transmission shaft in a rotationally fixed manner, but is able to move axially along an axis of the transmission shaft. The shifting device comprises an electromagnetic device which moves the shifter pawl axially. The electromagnetic device is arranged directly on the shifter pawl and acts directly upon the shifter pawl without the assistance and interposition of a shift fork. A magnetic field is produced at the electromagnetic device by a control unit. This magnetic field moves the shifter pawl axially over the transmission shaft, such that the torque-transmitting connection is produced, between the transmission shaft and the countershaft. Since the action direction of the magnetic field can be reversed, the shifter pawl can be moved axially in both directions along the axis.

A disadvantage of the shifting devices described in the prior art is that at low temperatures large shifting forces have to be applied, since the oil on the shifter pawl becomes very viscous at low temperatures. Furthermore, the known shifting devices need to be improved in terms of component arrangement, the use of the space available and the accessibility of the shift elements.

The purpose of the present invention is to overcome the disadvantages of the prior art.

SUMMARY OF THE INVENTION

According to the invention, the torque-transmitting connection between two components of a shift transmission, in particular the connection of a transmission shaft with a toothed gear wheel, which is mounted to rotate on the transmission shaft, is produced by an electromagnetic shifting device. To implement a gear ratio, a shifter pawl arranged in a rotationally fixed manner on the transmission shaft is moved axially along the rotational axis of the transmission shaft. The toothed gear wheels, mounted to rotate on the transmission shaft, have internal teeth and the shifter pawl has external teeth. When the internal teeth of the toothed gear wheel and the external teeth of the shifter pawl are engaged with one another, a torque-transmitting connection is formed. Alteration of speeds, between the transmission elements to be connected, takes place by virtue of motor synchronization, if necessary in combination with a transmission brake. According to the invention, the shifter pawl is moved axially by a linear motor. Linear motors comprise a primary portion and a secondary portion and follow the same functional principle as polyphase induction motors, whereby the originally circularly arranged electric energizing windings are arranged in one plane. The designation of the primary and secondary portions is determined in accordance with the size ratio (geometrical length) of the structural groups. The longer structural group is denoted as the primary portion and the shorter structural groups as the secondary portion. To actuate a linear motor, both the primary portion and the secondary portion can be acted upon by a control unit. In a linear motor the primary portion can constitute either the positionally fixed component (corresponding to the stator in a polyphase motor) or the moving component (corresponding to the rotor in a polyphase motor). The same correspondingly applies to the secondary portion. According to the invention, the primary portion of the linear motor can be arranged either in the shifter pawl or in the transmission shaft, which is made as a hollow shaft. Correspondingly, the secondary portion of the linear motor can also be arranged in the shifter pawl or in the transmission shaft. By virtue of the actuation of the linear motor, which is done by way of a control unit, a longitudinally moving magnetic field is formed by which the shifter pawl is displaced axially along the axis of the transmission shaft. Since the action direction of the magnetic field can be reversed, the shifter pawl can be displaced in both movement directions. The electrical energy for the linear motor is produced by a generator unit. By virtue of the generator unit, the mechanical energy (kinetic energy) of the transmission shaft is converted to electrical energy. For this, the speed difference between the transmission shaft, for example the main shaft or countershaft, and the transmission housing is used. The generator unit consists of a magnet, for example an electromagnet, which is solidly attached by some means to the transmission housing and a coil, which is located in the magnetic field of the magnet and is in a rotationally fixed manner with the transmission shaft. When the transmission shaft rotates, the coil moves within the magnetic field. In accordance with the generator principle, this produces a voltage which is transmitted to an energy unit. If the energy unit and the coil are rotating at the same speed, the induced voltage can be transmitted to the energy unit via corresponding electric lines. Otherwise, the energy transfer can take place telemetrically, for example inductively, or by sliding contacts. The energy unit serves to supply energy to the control unit of the linear motor and contains a storage unit. The storage unit stores electrical energy produced by the generator unit, for example by way of supercaps, in order to ensure that a shift operation can take place even when the vehicle is at rest, i.e., when there is no speed difference between the transmission shaft and the transmission housing. The connection between the energy unit and the control unit of the linear motor can be realized by corresponding electric lines if the energy unit and the control unit are rotating at the same speed or otherwise by way of sliding contacts or telemetrically. The control signals for the linear motor are transmitted to the control unit of the linear motor by a further electronic control unit (ECU). This signal transmission can take place telemetrically via the rotating transmission shaft, for example inductively or capacitatively. For inductive signal transmission, the possibility exists of using the magnetic field of the generator unit. Likewise, it is conceivable for the signal transmission, between the ECU and the control unit of the linear motor, to take place via sliding contacts. At the same time, the ECU can serve as the energy supply for the control unit of the linear motor and, in that case, the generator unit would not be needed for energy supply. The control unit of the linear motor can be arranged inside, or on the transmission shaft.

During a shift operation in a shift transmission the positions of the shifter pawls are detected. According to the invention, the actual position of the shifter pawl is recognized by the linear motor directly on the shifter pawl, for example by virtue of the change of inductivity. To reduce the shifting forces at low temperatures, the linear motor can be actuated so that it serves as a heat source. In this way, the transmission oil, at least locally in the area of the shifting device, is warmed to operating temperature whereby the cold-running properties of the shifter pawl are improved. Furthermore, linear motors are characterized by high dynamics so that the shifter pawl can be actuated and a shift carried out rapidly. A linear motor can be used to actuate the shifter pawl in any shift transmission, for example in claw-type or synchronous transmissions. In addition, a different design form of the linear motor is conceivable, for example as a synchronous motor, an asynchronous motor, a direct-current motor or a cross-flow motor.

Since the shifter pawl is actuated by the shifting device described, no actuation elements are needed between the toothed gear wheels and these can therefore be arranged closer to one another, so improving upon the disadvantages of known shifting devices as regards component arrangement, the use of available space and the possibility of access to the shift elements.

BRIEF DESCRIPTION OF THE DRAWINGS

The invention will now be described, by way of example, with reference to the accompanying drawings in which.

DETAILED DESCRIPTION OF THE INVENTION

Figure 1:
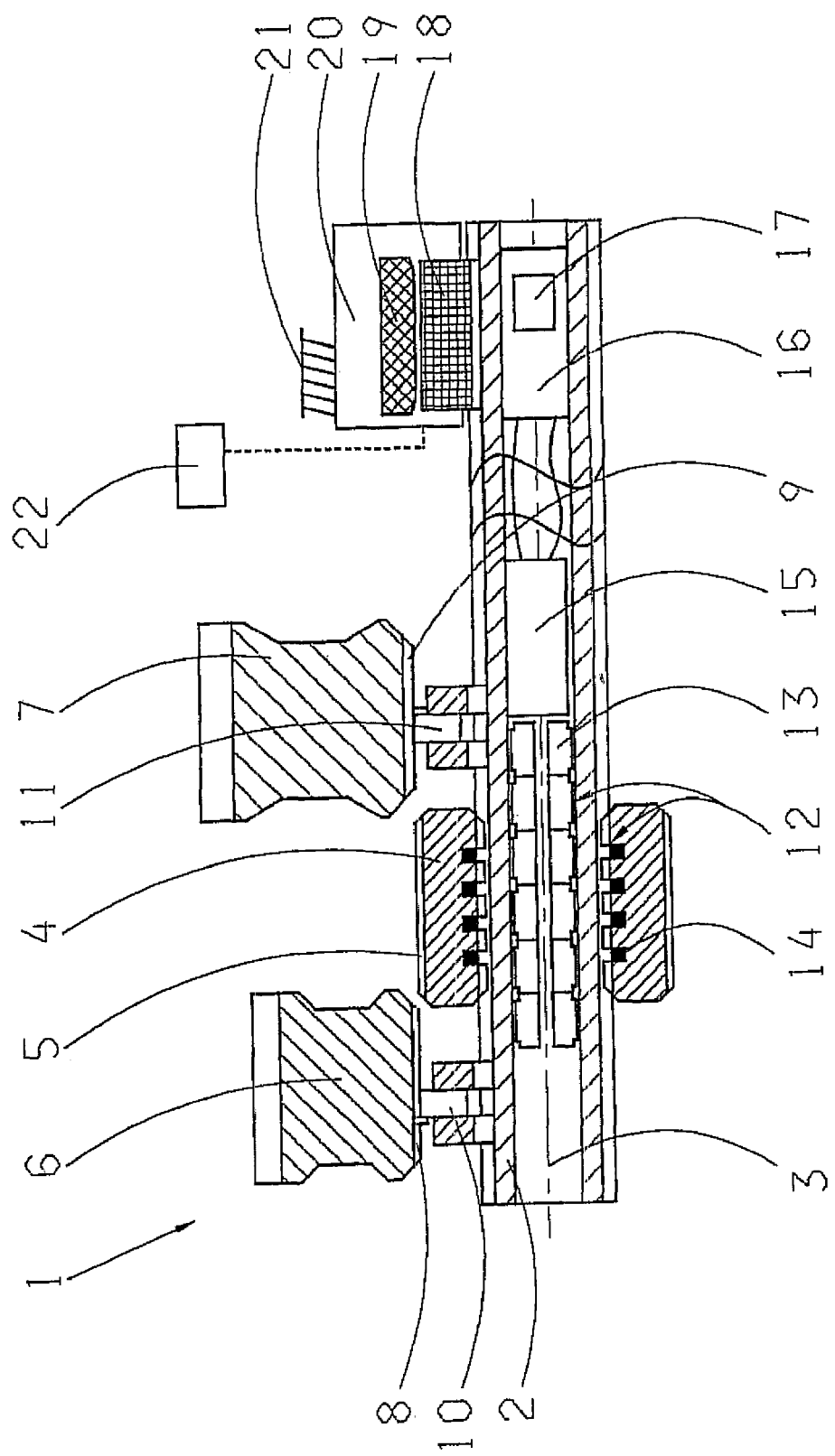
FIG. 1 is an electromagnetic shifting device with a linear motor, according to a first example embodiment.

FIG. 1 shows a section of a transmission 1. A first toothed gear wheel 6 and a second toothed gearwheel 7 are held by bearings 10 and 11 axially fixed, but able to rotate on a transmission shaft 2. The toothed gear wheels 6 and 7 each have inner teeth 8 and 9. A shifter pawl 4 is arranged rotationally fixed, but able to move axially on the transmission shaft 2, along an axis 3 of the transmission shaft 2. A primary portion 14 of a linear motor 12 is arranged in the shifter pawl 4 and a secondary portion 13 of the linear motor 12 is arranged in the transmission shaft 2, which is made as a hollow shaft. The linear motor 12 has a control unit 15 which is also accommodated in the transmission shaft 2. The control unit 15 could likewise be arranged outside or on the transmission shaft 2 (not shown here). A generator unit 20 is attached on a transmission housing 21. The generator unit 20 consists of a magnet 19, arranged in a fixed position and a rotationally fixed coil 18. Energy is supplied to the control unit 15 of the linear motor 12 by an energy unit 16 arranged in the transmission shaft 2, which comprises a storage unit 17. The energy unit 16 could also be arranged outside or on the transmission shaft 2 (not shown here).

For the rotationally fixed connection of the toothed gear wheel 6 to the transmission shaft 2 and to form a gear stage of the transmission 1 produced thereby, the shifter pawl 4 is moved axially along the axis 3 toward the left in the plane of the drawing. This takes place by appropriate actuation of the linear motor 12. From an electronic control unit (ECU) 22, the control unit 15 receives specific control signals, by virtue of which the linear motor 12 produces a longitudinally moving magnetic field which displaces the shifter pawl 4 in the axial direction over the toothed gear wheel 6. The outer teeth 5 of the shifter pawl 4 engage win synchronic numbers of revolutions of the shifter pawl 4 with the inner teeth 8 of the toothed gear wheel 6 into the inner teeth 8 of the toothed gear wheel 6. This connects the toothed gear wheel 6 rotationally fixed to the transmission shaft 2. To release the rotationally fixed connection, the linear motor 12 is actuated so as to move the shifter pawl 4 toward the right in the plane of the drawing, thereby releasing the teeth 5 of the shifter pawl 4 from the teeth 8 of the toothed gear wheel 6.

If the shifter pawl 4 should be in the neutral position, between the two toothed gear wheels 6 and 7, this can be done by appropriate actuation of the linear motor 12.

A connection of the toothed gear wheel 7 to the transmission shaft 2 by shifting out of the neutral position takes place in the corresponding, converse way. For this, the linear motor 12 is actuated so that a magnetic field, moving along the transmission shaft, is produced, which displaces the shifter pawl 4 axially in the direction toward the toothed gear wheel 7.

Figure 2:
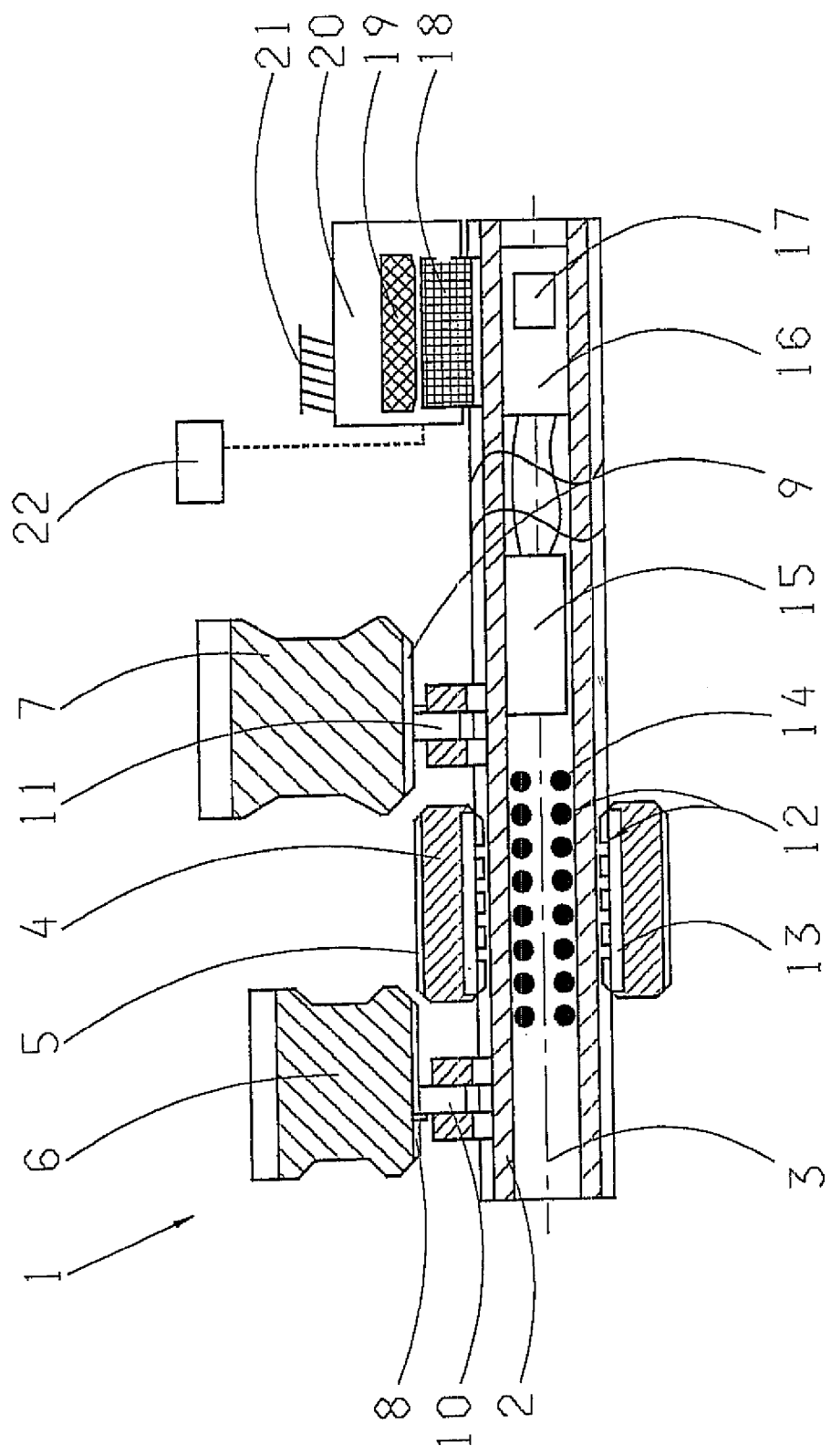
FIG. 2 is an electromagnetic shifting device with a linear motor, according to a second example embodiment.

FIG. 2 illustrates an electromagnetic shifting device with the linear motor 12, according to a second example embodiment. The difference between this embodiment and the embodiment according to FIG. 1 is that the primary portion 14 of the linear motor 12 is located in the transmission shaft 2 and the secondary portion 13 of the linear motor 12 is arranged in the shifter pawl 4. The further description of the Figure is the same as the description of FIG. 1.

REFERENCE NUMERALS 1 transmission
2 transmission shaft
3 axis
4 shifter pawl
5 outer teeth
6 toothed gear wheel
7 toothed gear wheel
8 inner teeth 9 inner teeth
10 bearing
11 bearing
12 linear motor
13 secondary portion
14 primary portion
15 control unit
16 energy unit
17 storage unit
18 coil
19 magnet
20 generator unit
21 transmission housing
22 electronic control unit (ecu)

The invention claimed is:

1. An electromagnetic shifting device for a transmission (1) comprising: an electronic control unit (22) and first and second toothed gear wheels (6, 7), which are rotatably supported on a vehicle transmission shaft (2) for rotation about an axis (3), the first and second toothed gear wheels (6, 7) forming a gear stage when rotationally fixed to the transmission shaft (2) by axial movement of a shifter pawl (4) along the axis (3) of the transmission shaft (2), each of the first and second toothed gear wheels (6, 7) having radially inwardly facing teeth (8), the shifter pawl (4) having mating radially outwardly facing teeth (5) and being rotationally fixedly supported on the transmission shaft (2) and being axially movable along the axis (3) of the transmission shaft (2) by an electric linear motor (12) comprising a primary portion (14) and a secondary portion (13), one of the primary and the secondary portions (13, 14) of the electric linear motor (12) being arranged within the transmission shaft (2) and the other of the primary and the secondary portions (14, 13) of the electric linear motor (12) being arranged in the shifter pawl, wherein the first and the second toothed gear wheels are both rotatably supported by and axially fixed on the transmission shaft, one of the primary portion and the secondary portion of the electric linear motor is a positionally fixed component, and the positionally fixed component is located within the transmission shaft (4).

2. The electromagnetic shifting device according to claim 1, wherein the primary portion (14) of the electric linear motor (12) is arranged in the shifter pawl (4) of the electric linear motor (12) and the secondary portion (13) of the electric linear motor (12) is arranged in the transmission shaft (2).

3. The electromagnetic shifting device according to claim 1, wherein the primary portion (14) of the electric linear motor (12) is arranged in the transmission shaft (2) and the secondary portion (13) of the electric linear motor (12) is arranged in the shifter pawl (4).

4. The electromagnetic shifting device according to claim 1, wherein the electric linear motor (12) is a position sensor for the shift pawl (4).

5. The electromagnetic shifting device according to claim 1, wherein electrical energy for a control unit (15) of the electric linear motor (12) is produced by a generator unit (20), which comprises a magnet (19) and a coil (18), which converts mechanical energy of the transmission shaft (2) into electrical energy.

6. The electronic shifting device according to claim 5, wherein the electrical energy is transmitted to an energy unit (16) which comprises a storage unit (17).

7. The electromagnetic shifting device according to claim 6, wherein the control unit (15) and the energy unit (16) are arranged inside the transmission shaft (12).

8. The electromagnetic shifting device according to claim 5, wherein control signals for the electric linear motor (12) are one of transmitted inductively and capacitively from an electronic control unit (22) to the control unit (15) of the electric linear motor (12).

9. The electromagnetic shifting device according to claim 5, wherein control signals for the electric linear motor (12) are transmitted, via sliding contacts, from the electronic control unit (22) to the control unit (15) of the electric linear motor (12).

10. The electromagnetic shifting device according to claim 1, wherein the electric linear motor (12) serves as a heat source for warming the shifting device.

11. A method for controlling an electromagnetic shifting device for a transmission (1) comprising an electronic control unit (22) and toothed gear wheels (6, 7), which are rotatably supported on a transmission shaft (2) for rotation about an axis (3), the toothed gear wheels (6, 7) forming a gear stage when rotationally fixed to the transmission shaft (2) by axial movement of a shifter pawl (4) along the axis (3), the shifter pawl (4) being moved axially along the axis (3) by an electric linear motor (12) comprising a primary portion (14) and a secondary portion (13), one of the primary and the secondary portions (13, 14) of the electric linear motor (12) being arranged in the transmission shaft (2) and another of the primary and the secondary portions (14, 13) of the electric linear motor (12) being arranged in the shifter pawl (4), the method comprising the step of:
producing electrical energy for a control unit (15) of the electric linear motor (12) by a generator unit (20) which converts mechanical energy of the transmission shaft (2) into the electrical energy.

12. The method according to claim 11, further comprising the step of transferring the electrical energy to an energy unit (16) which comprises a storage unit (17).

13. The method according to claim 12, further comprising the step of telemetrically transmitting the electrical energy from the energy unit (16) to the control unit (15) of the electric linear motor (12).

14. The method according to claim 11, further comprising the step of telemetrically transmitting control signals for the electric linear motor (12) from the electronic control unit (22) to the control unit (15) of the electric linear motor (12).

15. An electromagnetic shifting device for a transmission (1) with an electronic control unit (22) and first and second toothed gear wheels (6, 7), which are rotatably supported by and axially fixed on a hollow transmission shaft (2), the shifting device comprising:
a shifter pawl (4) being rotationally fixed on the hollow transmission shaft (2), the shifter pawl (4) being axially slidable between a first position and a second position, in the first position, radially outwardly facing teeth (5) of the shifter pawl (4) engage with mating radially inwardly facing teeth (8) of the first toothed gear wheel (6) so that the first toothed gear wheel (6) is rotationally fixed on the hollow transmission shaft (2), in the second position, the radially outwardly facing teeth (5) of the shifter pawl (4) engage with mating radially inwardly facing teeth (9) of the second toothed gear wheel (7) so that the second toothed gear wheel (7) is rotationally fixed on the hollow transmission shaft (2);

an electric linear motor (12) having a primary portion (14) and a secondary portion (13), the primary portion (14) of the electric linear motor (12) being a positionally fixed component located within the hollow transmission shaft (2) and the secondary portion (13) of the electric linear motor (12) being located in the shifter pawl (4), and the primary and the secondary portions (14, 13) communicate with one another for axially biasing the shifter pawl (4) along the hollow transmission shaft (2) between the first and the second positions.

\* \* \* \* \*